United States Patent
Stevens

(10) Patent No.: US 7,072,582 B2
(45) Date of Patent: Jul. 4, 2006

(54) OPTICAL TRANSMITTER POWER SETTING USING FEEDBACK

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 674 days.

(21) Appl. No.: 10/045,566

(22) Filed: Oct. 19, 2001

(65) Prior Publication Data

US 2003/0076569 A1    Apr. 24, 2003

(51) Int. Cl.
H04B 10/08 (2006.01)
H04B 17/00 (2006.01)
H04B 10/00 (2006.01)

(52) U.S. Cl. ........................................ 398/38; 398/162
(58) Field of Classification Search ................ 398/137, 398/162, 120, 197, 38, 93, 94, 151
See application file for complete search history.

(56) References Cited

U.S. PATENT DOCUMENTS

| | | | |
|---|---|---|---|
| 5,517,608 A * | 5/1996 | Suzuki et al. ................. 398/23 |
| 5,801,860 A * | 9/1998 | Yoneyama .................... 398/94 |
| 6,104,512 A * | 8/2000 | Batey et al. ................. 398/120 |
| 6,359,708 B1 * | 3/2002 | Goel et al. .................... 398/15 |
| 6,480,308 B1 * | 11/2002 | Yoshida et al. ............... 398/16 |
| 6,560,463 B1 * | 5/2003 | Santhoff ..................... 455/522 |
| 6,643,466 B1 * | 11/2003 | Helms et al. ............... 398/120 |

* cited by examiner

*Primary Examiner*—Leslie Pascal
*Assistant Examiner*—Shi K. Li

(57) ABSTRACT

A method and system for automatically setting output power levels of optical transmitters in an optical communications arrangement. The optical communications arrangement includes at least a first and a second node, wherein the transmitter of the first node is optically coupled to a receiver in the second node, and the transmitter in the second node is optically coupled to a receiver in the first node. Respective sequences of power-level messages are transmitted from the transmitters to the receivers. Each power-level message indicates an output power level used by the transmitter to transmit the message, and each power-level message in a sequence is transmitted at an increasing power level. The power levels at which the power-level messages are received by the receivers are detected, and when a receiver receives a power-level message at a power level that satisfies a selected power level, the output power level of the coupled transmitter is automatically set to the output power level indicated in the power-level message.

11 Claims, 4 Drawing Sheets

OPTICAL TRANSMITTER POWER SETTING USING FEEDBACK

FIELD OF THE INVENTION

The present invention generally relates to improving reliability in optical transmission systems and more particularly to automatically setting output signal power levels in an optical communications arrangement.

BACKGROUND

The speed and bandwidth of data transmission over fiber optic cable renders optical fiber communication particularly advantageous for various applications. Optical fiber transmissions typically include an optical transmitter at one end and an optical receiver at the other end. The distance between these devices is limited by the power of the optical transmitters, degradation of the laser diodes, signal loss and dispersion in the optical fiber, and the sensitivity of the optical receiver. Depending on the distance between the desired end points of the optical fiber transmission system, optoelectronic repeaters are usually included for boosting the signal before arriving at the desired end point.

In some systems, communications can be disrupted when the power level used to transmit data is either too high (signal overdriven) for the short distance to the receiver or is too low (signal underdriven) for the extended distance to the receiver. To protect against disruptions in communication, power level monitoring is implemented at the optical transmitter. However, the power level corrections that are made at the optical transmitter are through trial and error because the effect at the optical receiver is not known until after a power level is set. This approach also has the drawback of losing data during active communication. Signal degradation can also occur due to aged laser diodes and adverse changes in ambient temperatures.

Another approach for adjusting the output signal power level is monitoring the power level of the signal at the receiver, which is sometimes referred to as "weak link detection." Drawbacks to this approach include the need for complex and cumbersome diagnostic equipment, diagnostic optics, diagnostic data, and/or diagnostic software to regularly monitor communications between the transmitter and the receiver and/or the need to monitor the receive power level.

A method and a system that addresses the aforementioned problems, as well as other related problems, are therefore desirable.

SUMMARY OF THE INVENTION

In various embodiments, the invention provides a method and system for automatically setting output power levels of optical transmitters in an optical communications arrangement. The optical communications arrangement includes at least a first and a second node, wherein the transmitter of the first node is optically coupled to a receiver in the second node, and the transmitter in the second node is optically coupled to a receiver in the first node. Respective sequences of power-level messages are transmitted from the transmitters to the receivers. Each power-level message indicates an output power level used by the transmitter to transmit the message, and each power-level message in a sequence is transmitted at an increasing power level. The power levels at which the power-level messages are received by the receivers are detected, and when a receiver receives a power-level message at a power level that satisfies a selected power level, the output power level of the coupled transmitter is automatically set to the output power level indicated in the power-level message.

It will be appreciated that various other embodiments are set forth in the Detailed Description and claims that follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is generally directed to a method of establishing a power level for optical communications between two nodes, each node including an optical transmitter and an optical receiver for transmitting and receiving optical signals over two single-core optical fibers, While the present invention is not necessarily limited to such an application, the invention will be better appreciated through a description of example embodiments in such a specific context.

In one example embodiment, an optical communication system that is configured to communicate in a full duplex mode over two unidirectional fiber optic lines incorporates a feedback mechanism that facilitates power level matching between each transmitter and receiver pair in each of two nodes of the optical communication system. At start up, the two fiber optic lines are tuned by incrementally increasing the power level from the respective optical transmitters and sending successive power-level messages to the respective receivers until the receivers detect a message. Upon detecting a message on the first fiber-optic line, a feedback message is sent via the second fiber optic line to the first node to indicate that the first transmitter should set the power level as specified by the receiver. The second transmitter-receiver pair functions similarly.

Figure 1:
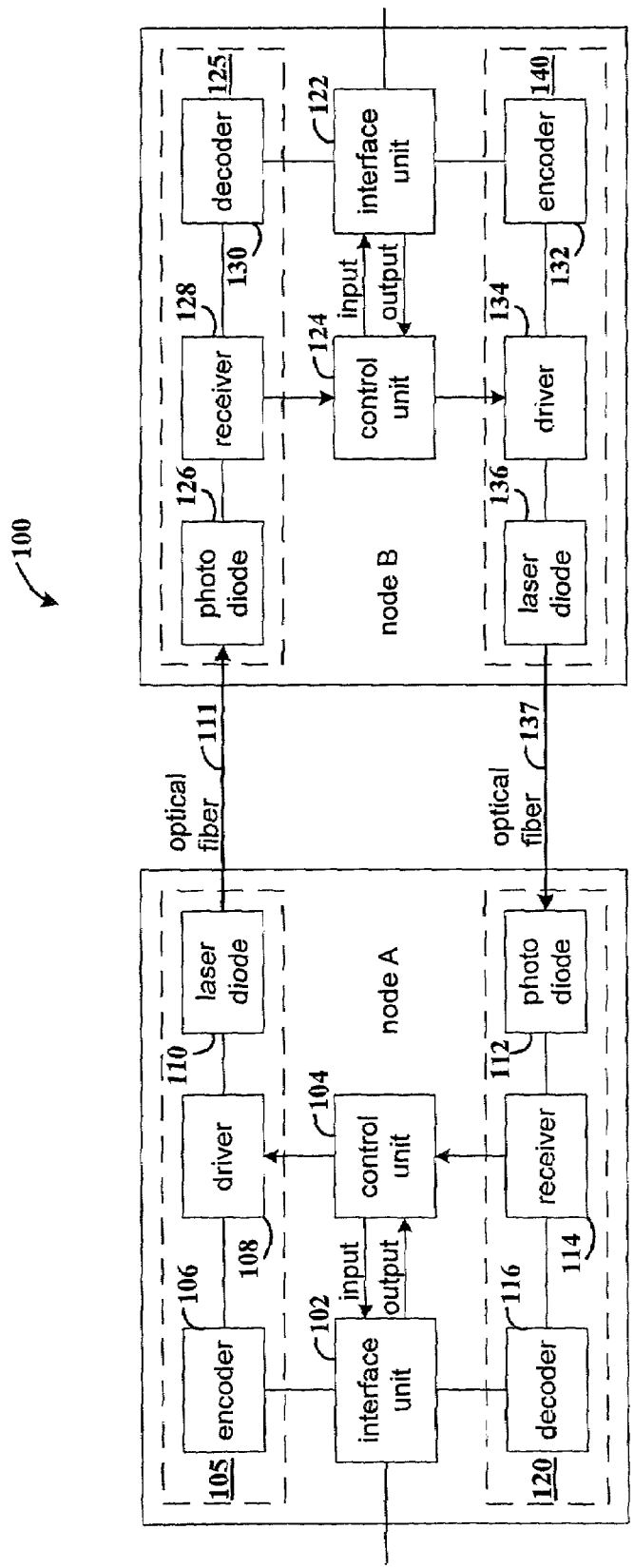
FIG. 1 is a block diagram of an optical communications arrangement having a power level matching feature made in accordance with an example embodiment of the invention.

Referring now to the figures, FIG. 1 is a block diagram of an optical communications arrangement 100 having a power level matching feature made in accordance with an example embodiment of the present invention. Nodes A and B communicate bi-directionally via two unidirectional fiber optic links 111 and 137. Arrangement 100 includes an interface unit 102 at node A, which is coupled to control unit 104 and to both a transmitter section 105 and a receiver section 120. Node B includes interface unit 122, which is coupled to control unit 124 and to both a transmitter section 125 and a receiver section 140.

When arrangement 100 is first powered-up, transmitter section 105 at node A sends a sequence of messages, with each successive message ("power-level message") being transmitted at a power level that is greater than the previous message. Each message indicates the power level applied in transmitting the message. Receiver section 125 receives the sequence of power-level messages and determines the power level at which each message is received ("received-power level"). When the received-power level is acceptable to receiver section 125, for example, as compared to a selected power level, the power level indicated in the message, which is identified as $P_{SR1}$ (power-specified-received level), is communicated back to the transmitter section 105.

While transmitter section 105 is transmitting power-level messages to receiver section 125, transmitter section 140 transmits a sequence of power-level messages to receiver section 120. When the power level of a received message is acceptable to receiver section 120, the power level indicated in the message, which is identified as $P_{SR2}$, is communicated back to transmitter section 140. When transmitter section 105 and receiver section 125 have identified an acceptable power level, and transmitter section 140 and receiver section 120 have identified an acceptable power level, normal application-defined communications can commence.

In the power-setting phase of operation, interface unit 102 provides a message to an encoder 106. A laser power level that is associated with the message is used to control the driver 108 via the control unit 104. Optical driver 108 receives the encoded signal from encoder 106 and drives a laser diode 110 to send the message via fiber optic line 111. Photodiode 126 in receiver section 125 receives the optical signal, which is provided to optical receiver 128. The optical receiver converts the message to an electrical signal for decoding by decoder 130. Interface unit 122 receives the message from the decoder, the message indicating to the control unit 124 the optical power at the receiver. The operation of the components in transmitter section 140 and receiver section 120 are similar.

It will be appreciated that the optical messaging between nodes A and B for matching the power levels transpires on the same fiber optic lines (e.g., lines 111 and 137) that are later used for normal optical communications between the nodes. Additional fiber optic lines are unnecessary to incorporate the power-matching feature of the present invention.

In the example embodiments described above, optical drivers 108 and 134 are implemented with laser diode drivers such as those available from AMCC of San Diego, Calif. For example, the driver is a CMOS 2.5 Gbps quad 850 nm vertical cavity surface emitting laser (VCSEL) driver. The driver is configurable to increase or decrease the power output of laser diodes 110 and 136 by adjusting the values of internal registers of the driver circuit for the bias current and modulation current. The power output levels are checked many times per second to respond to changes in ambient temperature. The values of the internal registers of the bias and modulation current are then modified to compensate for changes in ambient temperature.

Figure 2A:
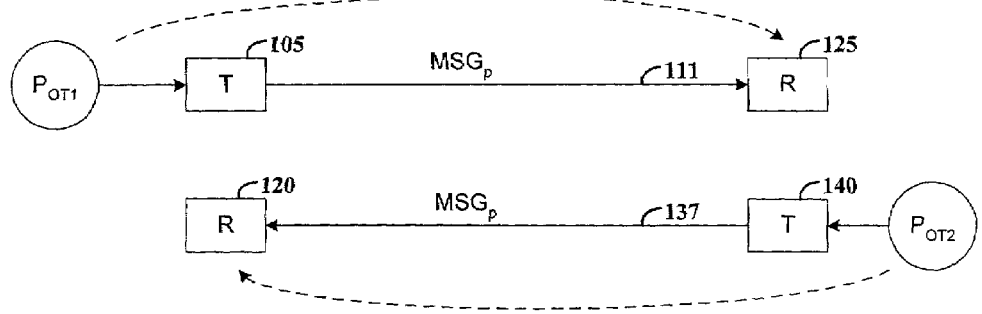
FIGS. 2A–2C illustrate a process flow for establishing the power level of optical communication on the respective fiber optic lines in accordance with an example embodiment of the invention.
Figure 2B:
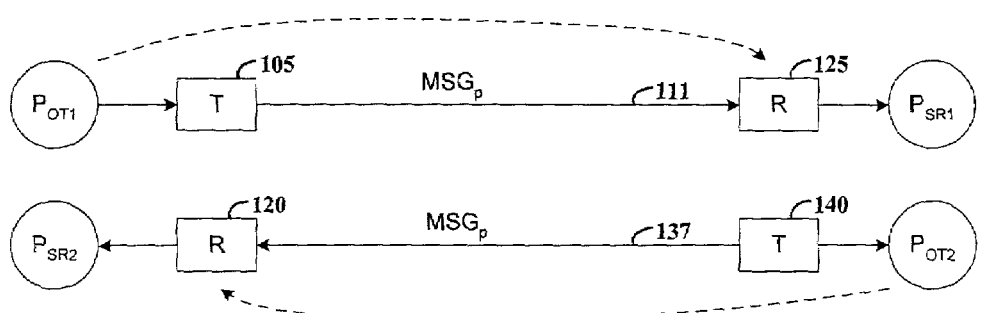
Figure 2C:
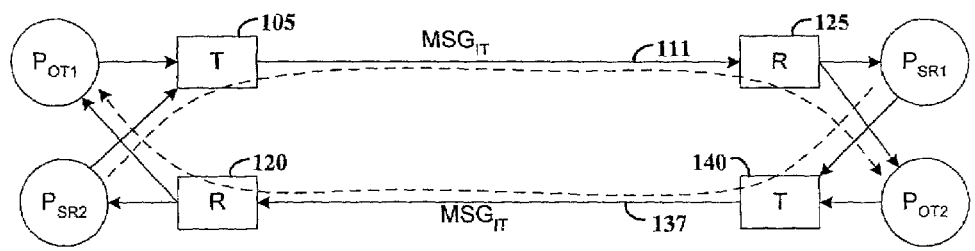

FIGS. 2A, 2B and 2C illustrate a process flow for establishing the power level for transmitting optical signals between two nodes in accordance with an example embodiment of the present invention. In FIG. 2A, $MSG_p$ refers to a sequence of power-level messages from a transmitter section to a receiver section. Each message in a sequence is transmitted at a power level that is greater than the power level at which the previous message in the sequence was transmitted. Furthermore, each power-level message includes information that indicates the power-level at which the message was transmitted. Power level $P_{OT1}$ is contained in messages $MSG_p$ that are communicated from transmitter section 105 to receiver section 125 via fiber optic line 111. Similarly, power level $P_{OT2}$ is contained in messages $MSG_p$ that are communicated from transmitter section 140 to receiver section 120 via fiber optic line 137.

In FIG. 2B, receiver sections 120 and 125 determine the power levels at which the messages in the sequences are received. When receiver section 125 receives a message that meets a selected optimum power level, the power level indicated in the message, $P_{SR1}$ is saved for communicating back to set the output power level of transmitter section 105. Similarly, receiver section 120 stores power level value $P_{SR2}$ when it receives a message at a suitable power level. Until both unidirectional links are established, the $P_{SR1}$ and $P_{SR2}$ values cannot be communicated back to the respective transmitter sections. The power levels at which the transmitter sections operates may be different due to, for example, ambient temperatures at the receiver or transmitter, age and condition of the equipment and fiber optic cables, and sensitivity of the receivers.

In FIG. 2C, once both unidirectional links have saved $P_{SR1}$ and $P_{SR2}$ values, the output power levels $P_{OT}$ at transmitters 105 and 140 are set to the power levels identified by receiver sections 125 and 120, respectively. Transmitter section 140 takes the power value $P_{SR1}$ as saved by receiver section 125 and transmits the power value $P_{SR1}$ in a message via fiber optic line 137. The message contains data that indicate to receiver section 120 that the power value in the message is to be used to set the output power level of transmitter section 105. In response to the message, transmitter section 105 sets the power output $P_{OT1}$ to the power level $P_{SR1}$. Receiver section 125 receives from transmitter section 105 a similar message indicating power level $P_{SR2}$, and transmitter section 140 sets its output power level $P_{OT2}$ to $P_{SR2}$.

After setting the power levels of the transmitters, the transmitters transmit initialization messages, designated as $MSG_{IT}$, to receivers 125 and 120, respectively. The initialization messages indicate whether initialization is complete. Once both nodes have completed initialization, the nodes can commence application-defined communications.

Referring briefly to FIG. 1, power values $P_{SR1}$ and $P_{SR2}$ are stored in internal registers of optical receivers 128 and 114, respectively. Once initialization is complete the receiver-selected transmit power levels are transferred to the internal control registers in the respective optical drivers 108, 134. The output drivers in turn control output power of laser diodes 110 and 136 using the values in the internal registers. In another embodiment, arrangement 100 also includes monitoring circuits, within interface units 102 and 122, that monitor the power levels of signals received at receiver sections 120 and 125 during normal optical communications between nodes A and B. The monitoring circuits are coupled to receiver circuits 114 and 128 and to drivers 108 and 134 via control units 104 and 124. The monitoring circuit detects whether the power levels of messages received at the respective receivers have dropped below power values $P_{SR1}$ and $P_{SR2}$. If the power levels drop on one or both of lines 111 and 137, the monitoring circuit adjusts the bias and current modulation of drivers 108 and 134 to boost the power output by laser diodes 110 and 136.

Figure 3A:
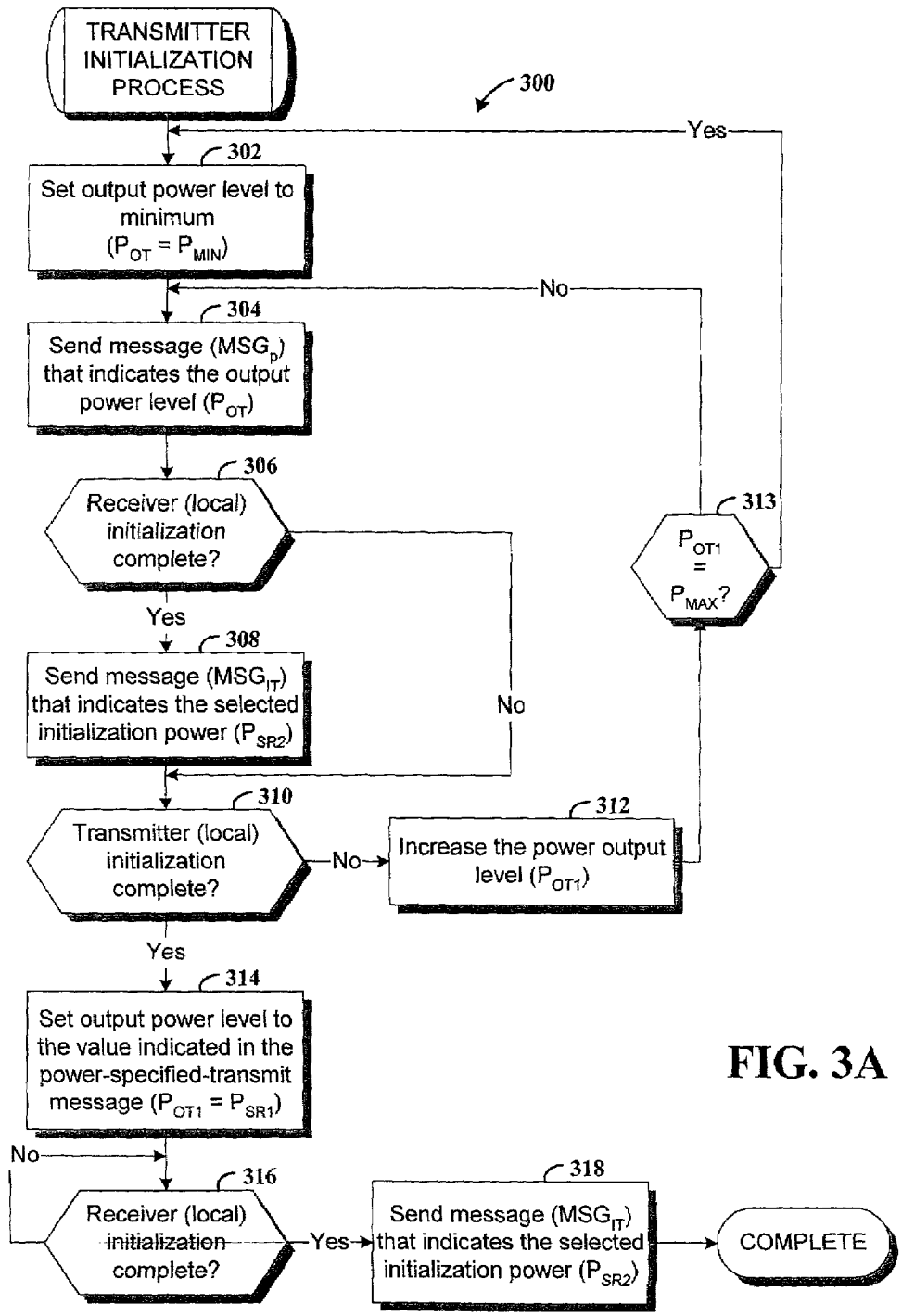
FIG. 3A is a flowchart of a process for adjusting a power level of an optical transmitter upon receiving feedback from an optical receiver.

FIG. 3A is a flowchart of an example transmit process 300 performed by an optical signal transmitter in setting an output power level of the transmitter, for example in node A. Process 300 applies to the example embodiments of the optical communication arrangements described in FIGS. 1 and 2A–2C. At step 302, an optical transmitter sets the output power level $P_{OT}$ to a minimum level $P_{MIN}$. At step 304, the transmitter sends a power-level message, $MSG_p$, to the receiver. The message indicates the output power level of the transmitter. Initially, the power level is $P_{MIN}$. At step 306, the transmitter process checks whether the local receiver section has completed initialization with the remote transmitter. For FIGS. 3A and 3B, "local" and "remote" are relative to the node in which the transmitter or receiver process is being performed. If the local receiver initialization is complete, the process is directed to step 308 where the transmitter transmits to the receiver a power-specified-receive value, $P_{SR1}$, in an initialization-complete message, $MSG_{IT}$. Recall that the $P_{SR}$ value is sent in an $MSG_{IT}$ message when a receiver has determined an output power level at which the corresponding transmitter is to operate.

Decision step 306 causes the transmitter process to skip step 308 and continue at step 310 until the local receiver indicates that receiver initialization is complete. Decision step 310 determines whether the initialization of the local transmitter is complete. It will be seen in the discussion of FIG. 3B that the local receiver process determines when the local transmitter initialization is complete. Decision step 310 directs the transmitter process to step 312 until transmitter initialization is complete. At step 312, the output power level ($P_{OT1}$) of the local transmitter is increased by a selected quantity. In one embodiment, the output power level is increased in fixed increments. In other embodiments, other suitable functions of the current output power level may be used to select a new output power level. At decision step 313, the process checks whether the output power level has reached a selected maximum level, $P_{MAX}$. If the output power level has reached the maximum level, the process is returned to step 302 to reset the output power level to the minimum power level. Otherwise, the process returns to step 304 where another power-level message ($MSG_P$) is sent at the new output power level.

Once the local receiver indicates to the local transmitter that transmitter initialization is complete, decision step 310 directs the transmitter process to step 314. At step 314 the output power level of the transmitter ($P_{OT1}$) is set to the power level $P_{SR1}$, which is the $P_{SR1}$ value as determined by the remote receiver and communicated to the local receiver.

The transmitter process then loops at decision step 316 until the local receiver initialization is complete. That is, the transmitter process waits until the local receiver identifies a suitable output power level for the remote transmitter. When the local receiver has completed initialization (i.e., identified a suitable output power level for the remote transmitter), decision step 316 directs the process to step 318 where the initialization-complete message with the $P_{SR2}$ value is sent to the remote receiver to complete the transmitter initialization process.

Figure 3B:
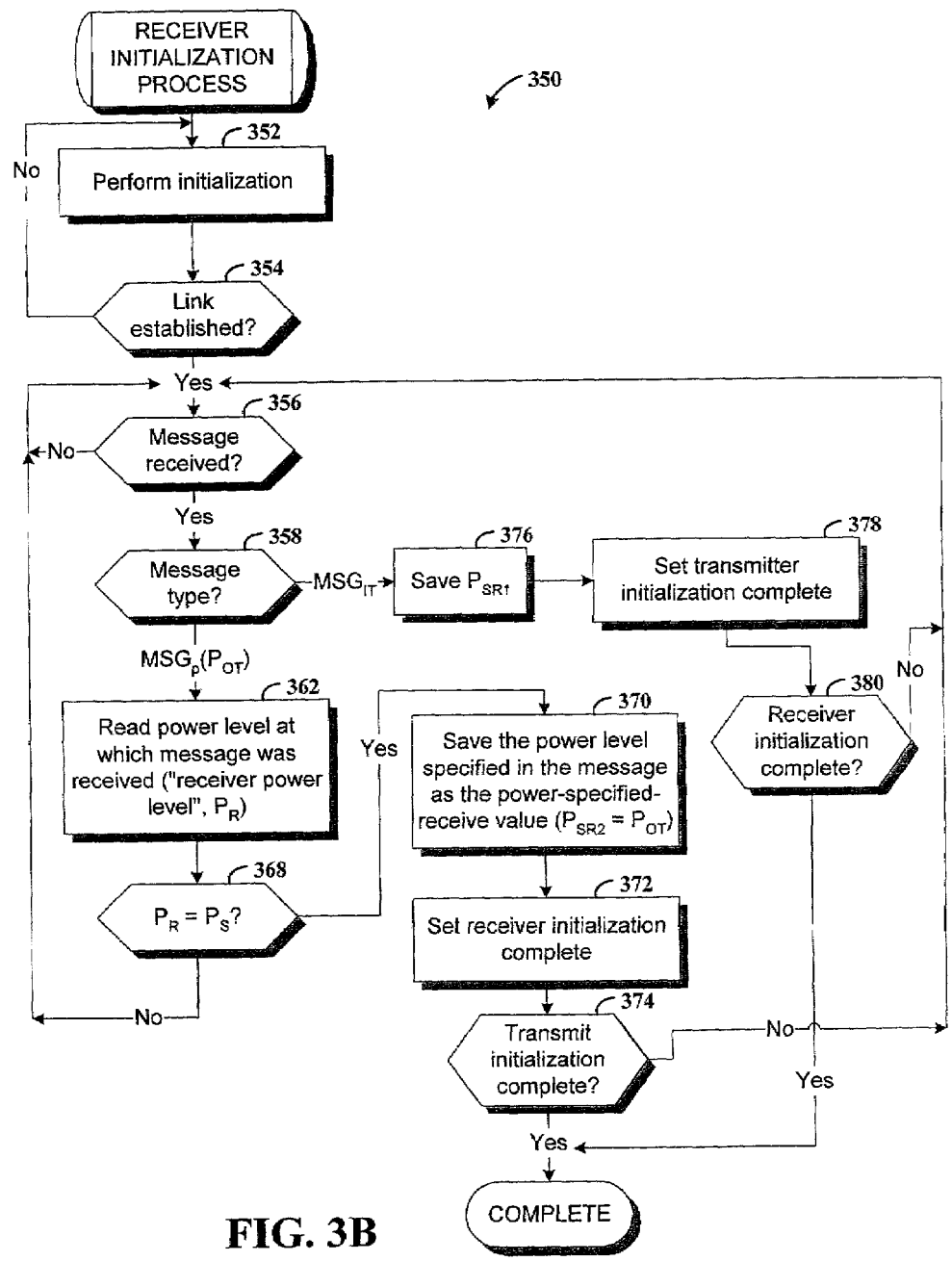
FIG. 3B is a flowchart of a process for sending feedback from an optical receiver to adjust a power level of an optical transmitter.

FIG. 3B is a flowchart of an example receiver process 350 for setting the output power level of a transmitter, for example in node A of FIG. 1. At step 352, the receiver is initialized and at step 354 the optical link with the remote transmitter is verified. If the link is not established then step 352 is repeated because until a link is established the receiver is unable to receive messages. Otherwise, at step 356 the receiver process waits for receipt of a message. Once a message is received, decision step 358 determines the type of message received. If the received message is a power-level message ($MSG_P$ that carries a $P_{OT}$ value), the process is directed to decision step 362. At step 362 the power level at which the message was received ("receiver power level", $P_R$) is read, for example, from an internal register of the receiver circuit 114.

The receiver power level in combination with a specified power level, $P_S$, are used to determine when the remote transmitter is transmitting at a desired output power level. In one embodiment, the specified power level is selected by the user. In another embodiment, the selected power level is automatically set a certain level above the level at which the first message was received. Decision step 368 returns the process to decision step 356 to wait for the next message if the receiver power level is not equal to the specified power level. Once the receiver power level reaches the specified power level, the process is directed to step 370.

At step 370, the output power level (POT) specified in the power-level message is saved as the power-specified-received value ($P_{SR2}$). The power-specified-received value specifies the desired the output power level setting for the remote transmitter. At step 372, the receiver sets a flag indicating that receiver initialization is complete. If the transmit initialization is also complete, then the receiver initialization process is complete. Otherwise, the process returns to decision step 356.

When decision step 358 finds an initialization complete message, the process is directed to step 376 where the power-specified-transmit level, $P_{SR1}$, from the $MSG_{IT}$ message is saved. At step 378, the transmitter initialization complete flag is set. Decision step 380 tests whether receiver initialization is complete. When both transmitter initialization and receiver initialization are complete, the receiver initialization process is finished. Otherwise, the process returns to decision step 356.

The present invention provides an advantage of improving reliability of optical communication systems because the power level of the optical sources need not be overdriven to ensure uninterrupted communications. The present invention also provides the advantage of compensating for transmission power losses due to interconnect loss variations. With the present invention, the power level of the transmitter is selected to optimize the optical link with the receiver based on bandwidth, BER, or on reliability characteristics due to the power level detected at the receiver.

The above embodiments can be implemented by modifying commercially available laser diode drivers to operate consistent with the above-described operation. The present invention is believed to be applicable to a variety of applications involving optical fiber connection assemblies. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for automatically setting output power levels of optical transmitters in an optical communications arrangement having at least a first and a second node, wherein the transmitter of the first node is optically coupled to a receiver in the second node, and the transmitter in the second node is optically coupled to a receiver in the first node, comprising:

transmitting respective sequences of power-level messages from the transmitters to the receivers, wherein each message in a sequence includes output-power code that indicates an output power level used by the transmitter to transmit the message, and each transmitter uses increasing power levels to transmit each power-level message in the sequence;

detecting power levels at which the power-level messages are received by the receivers; and when a receiver receives a power-level message at a power level that satisfies a selected power level, automatically setting an output power level of the coupled transmitter to the output power level indicated in the power-level message.

2. The method of claim 1, further comprising at each receiver:

detecting a power level at which a power-level message is first received;

setting the selected power level as a function of the power level at which a power-level message is first received.

3. The method of claim 2, further comprising setting the selected power level a selected quantity above the power level at which the power-level message is first received.

4. The method of claim 1, wherein a transmitter and a receiver in the same node are local relative one to another, a transmitter and a receiver in different nodes are remote relative one to another, and the power-level message that satisfies the selected power level is a satisfactory power-level message, further comprising:
providing a receiver-initialization complete signal to the local transmitter when the local receiver receives the satisfactory power-level message;
transmitting, in response to the receiver-initialization complete signal, a transmit-initialization-complete message from the local transmitter to the remote receiver for setting the output power level of the remote transmitter, wherein the transmit-initialization-complete message includes the output-power code from the satisfactory power-level message.

5. The method of claim 4, further comprising:
providing a transmit-initialization-complete signal from the remote receiver to the remote transmitter in response to receipt of the transmit-initialization-complete message; and
setting, in response to the transmit-initialization-complete signal, the output power level of the remote transmitter to the power level indicated by the output-power code in the transmit-initialization-complete message.

6. The method of claim 5, further comprising at each receiver:
detecting a power level at which a power-level message is first received;
setting the selected power level as a function of the power level at which a power-level message is first received.

7. The method of claim 6, further comprising setting the selected power level a selected quantity above the power level at which the power-level message is first received.

8. An apparatus for automatically setting output power levels of optical transmitters in an optical communications arrangement having at least a first and a second node, wherein the transmitter of the first node is optically coupled to a receiver in the second node, and the transmitter in the second node is optically coupled to a receiver in the first node, comprising:
means for transmitting respective sequences of power-level messages from the transmitters to the receivers, wherein each message in a sequence includes output-power code that indicates an output power level used by the transmitter to transmit the message, and each transmitter uses increasing power levels to transmit each power-level message in the sequence;
means for detecting power levels at which the power-level messages are received by the receivers;
means, responsive to receipt by a receiver of a power-level message at a power level that satisfies a selected power level, for automatically setting an output power level of the coupled transmitter to the output power level indicated in the power-level message.

9. A circuit arrangement for automatically setting output power levels of optical transmitters in an optical communications arrangement, comprising:
a first node having a first transmitter, a first receiver, and a first control circuit coupled to the first transmitter and to the first receiver;
a second node having a second transmitter, a second receiver, and a second controller coupled to the second transmitter and to the second receiver, wherein the second transmitter is optically coupled to the first receiver of the first node, and the second receiver is optically coupled to the first transmitter of the first node;
wherein the first and second transmitters are configured to transmit respective sequences of power-level messages to the second and first receivers responsive to the first and second control circuits, each power-level message in a sequence transmitted at an increasing power level and including an output-power code that indicates an output power level used to transmit the message;
wherein the first and second receivers are configured to detect power levels at which the power-level messages are received; and
wherein the first and second control circuits are configured to determine when power levels at which power-level messages are received satisfy respective, selected power levels and automatically set output power levels of the first and second transmitters to power levels indicated in the power-level messages.

10. The circuit arrangement of claim 9, wherein a power-level message that satisfies a selected power level is a satisfactory power-level message,
wherein the first receiver is further configured to provide a first receiver-initialization complete signal to the first transmitter when the first receiver receives a first satisfactory power-level message, and the second receiver is further configured to provide a second receiver-initialization complete signal to the second transmitter when the second receiver receives a second satisfactory power-level message; and
wherein the first transmitter is further configured to transmit, in response to the first receiver-initialization complete signal, a first transmit-initiation-complete message to the second receiver for setting the output power level of the second transmitter, the first transmit-initialization-complete message including the output-power code from the first satisfactory power-level message, and the second transmitter is further configured to transmit, in response to the second receiver-initialization complete signal, a second transmit-initialization-complete message to the first receiver for setting the output power level of the first transmitter, the second transmit-initialization-complete message including the output-power code from the second satisfactory power-level message.

11. The circuit arrangement of claim 10,
wherein the first receiver is configured to provide a first transmit-initialization-complete signal to the first control circuit in response to receipt of the second transmit-initialization-complete message, and the second receiver is configured to provide a second transmit-initialization-complete signal to the second control circuit in response to receipt of the first transmit-initialization-complete message; and
wherein the first control circuit is configured to set, in response to the first transmit-initialization-complete signal, the output power level of the first transmitter to the power level indicated by the output-power code in the second transmit-initialization-complete message, and the second control circuit is configured to set, in response to the second transmit-initialization-complete signal, the output power level of the second transmitter to the power level indicated by the output-power code in the first transmit-initialization-complete message.

* * * * *